April 24, 1962
P. O. ROOT ET AL
3,030,754
SEPARATION DEVICE
Filed Oct. 17, 1960
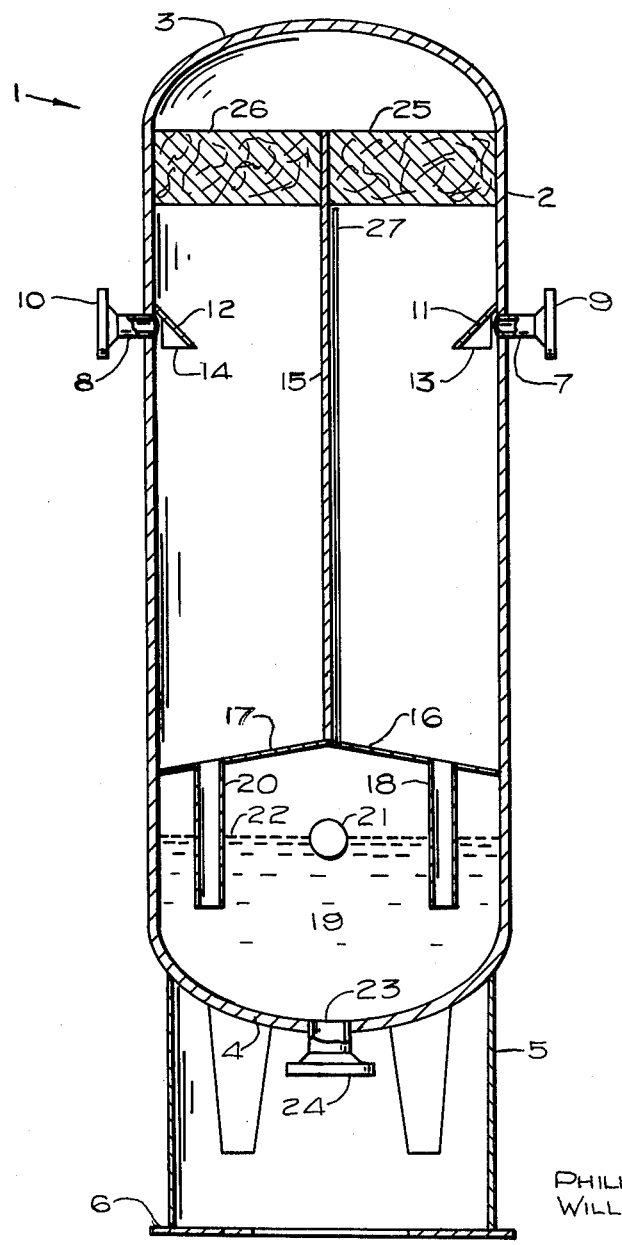
PHILLIP O. ROOT &
WILLIAM F. CHAPLE
INVENTORS
BY *[signature]*
ATTORNEY 3,030,754
SEPARATION DEVICE
Phillip O. Root and William F. Chaple, Oklahoma City, Okla., assignors to Black, Sivalls & Bryson, Inc., Kansas City, Mo., a corporation of Delaware
Filed Oct. 17, 1960, Ser. No. 63,066
1 Claim. (Cl. 55—320)

The present invention relates to an apparatus for separating liquids and solids from a gaseous stream. In particular, the present invention relates to a separation apparatus which will separate entrained liquids and solids from a fluid stream wherein the separation device is positioned in a fluid flow line and is designed to remove entrained solids and liquids and free liquids from a fluid stream with the fluid stream flowing in either direction through the fluid flow line.

Many devices have been designed to remove entrained solids and liquids and free liquids from a fluid stream but in all devices the reversal of flow of the fluid stream will cause such devices to be ineffective in operation and flow reversal in some such devices will cause liquids and solids to be entrained in the fluid stream. With the spread of natural gas pipelines and underground storage of natural gas, a need has arisen for a separation device which will remove the liquids and solids from natural gas regardless of the direction in which the natural gas stream is flowing. For example, when natural gas is injected into an underground natural gas storage facility, it is considered necessary to remove as much of the liquids and solids from the natural gas stream prior to its injection in order to assure the proper operation of the injection system. When the natural gas is removed from the underground storage, it may have liquids and solids entrained therein which should be removed to maintain high efficiencies in the operation of pipelines and distribution systems. In many pipelines due to the interconnections of many distribution systems the natural gas may flow in one direction for a period of time and then because of a shifting of demand, the flow of the natural gas stream will reverse and flow in the other direction. In both such applications a separation device which will efficiently separate the entrained solids and liqiuds and the free liquids from the flowing natural gas stream is a necessity. Otherwise, a pair of separation devices possibly would have to be used and a system of check valves to direct the flow of the natural gas stream to the proper separation device.

Therefore, the primary object of the present invention is to provide a separation device for efficient separation of liquids and solids from a natural gas stream regardless of the direction of flow of the natural gas stream. Another object of the present invention is to provide a separation device having both an internal reversal of direction and an agglomerator to remove the liquids from the gas stream flowing therethrough.

These and other important objects of the present invention are more fully explained and described in the accompanying drawing wherein:

The FIGURE is a detailed sectional view taken on a vertical plane passing through the center of a separation device constructed in accordance with the present invention.

Referring more in detail to the drawing:

Separator 1 shown in the FIGURE comprises an upright cylindrical shell 2, upper dished head 3 and lower dished head 4. Skirt 5 is secured to lower dished head 4 to support separator 1 in an upright position. Base ring 6 is secured to skirt 5 to provide a proper base for the support of separator 1 when installed. Ducts 7 and 8 are shown to have flanges 9 and 10 respectively or any other suitable type of connections. Ducts 7 and 8 both extend through upright cylindrical shell 2 into the interior of separator 1. Deflector plates 11 and 12 are positioned within shell 2 directly above the connections of ducts 7 and 8 respectively and extend downwardly and inwardly within separator 1. Deflector plate 11 is supported by brackets 13 positioned at the side edges of plate 11, only one of the brackets 13 being shown in the figure. Deflector plate 12 is similarly supported by brackets 14. The interior of separator 1 is divided throughout a substantial portion of the height of shell 2 by vertical partition 15 which is secured at each side to the inner surface of shell 2. Transverse partitions 16 and 17 are each secured to the lower edge of vertical partition 15 and also to the inner surface of shell 2 as shown. Downcomer 18 extends through transverse partition 16 and depends therefrom into the lower portion of liquid collecting chamber 19. Downcomer 20 extends through transverse partition 17 and depends therefrom into the lower portion of liquid collecting chamber 19. A suitable liquid level control mechanism such as float 21 is provided to maintain the liquid level 22 within liquid collecting chamber 19 above the lower extremity of downcomers 18 and 20. Liquid outlet 23 extends from liquid collecting chamber 19 through head 4 and is provided with flange 24 or other suitable connection. A dump valve (not shown) should be connected into liquid outlet 23 to be controlled by the operation of float 21 to dump the liquids collecting in chamber 19 thereby maintaining the proper height of liquid level 22. Mist extraction elements 25 and 26 extend on their respective sides of vertical partition 15 to the inner surface of shell 2. Care should be taken with the installation of mist extraction elements 25 and 26 to assure that there are no open spaces near the inner surface of shell 2 or next to vertical partition 15 so that the gas flowing through separator 1 will have to pass through both elements 25 and 26 and will not have an open path to bypass elements 25 and 26. Equalizer pipe 27 extends from chamber 19, through partition 16 into the upper portion of separator 1 below element 25.

In operation the connections to the fluid flow line are made through flanges 9 and 10 into ducts 7 and 8. Since the flow in the fluid flow line will be designed to conduct the flow of natural gas in either direction and since the main purpose of the design of separator 1 is to have a separator which will function with flow in either direction, it is immaterial how the connections are made into ducts 7 and 8. Assuming, for example, that a connection is made so that the gas stream flows into separator 1 through duct 7, then the total stream flow will be deflected toward the lower portion of separator 1 by deflector plate 11. This will cause the free liquids and heavy liquid and solid particles to drop to the lower portion of separator 1. The flow path of the gas will reverse to an upwardly direction and will pass through mist extraction element 25, will flow over the upper extremity of vertical partition 15 in the space under head 3. The gas flow will continue down through mist extraction element 26, under deflector plate 12 and out of separator 1 through duct 8. When the flow is in the direction just described, then duct 7 will serve as an inlet for separator 1 and duct 8 will serve as the gas outlet for separator 1. It should be pointed out that in passing through mist extraction elements 25 and 26 that efficient removal of the entrained liquid and solids is accomplished. In flowing from mist extraction element 26 under deflector plate 12 and out through duct 8, the gas is again caused to reverse its direction of flow from a downwardly to an upwardly direction which will cause additional separation of entrained liquids and solids when these have passed through mist extraction elements 25 and 26 without being removed from the gas stream. The liquids separated from the gas stream will flow downwardly and collect on transverse partitions 16 and 17 and will drain into liquid collecting chamber 19 through downcomers 18 and 20. The liquids collecting in chamber 19 will be discharged through liquid outlet 23 under the control of a valve mechanism actuated by float 21.

When it is desired to reverse the flow direction in the fluid flow line, no valves have to be actuated to assure the proper operation of separator 1. The fluid stream will enter separator 1 through duct 8, will flow under deflector plate 12, through mist extraction elements 26 and 25 and out of separator 1 through duct 7 after passing under deflector plate 11.

From the foregoing it can be understood that the present invention has provided a new and novel separation device which will operate in a pipeline or other fluid flow line in which the direction of flow will vary from time to time and wherein the separation device functions equally well to remove entrained solids and liquids and free liquids from the fluid stream without respect to the direction of fluid flow.

What we claim and desire to secure by Letters Patent is:

A device for separating liquids and solids from a gas stream which flows in one direction at certain times and flows in the opposite direction at other times comprising, an upright vessel, a vertical partition dividing said vessel into two chambers, a pair of connections into said vessel, each of said connections connecting into one of said chambers, a pair of deflector baffles affixed to the interior of said upright vessel, each of said deflector baffles being positioned immediately above one of said connections to direct the inward flow through said connections into said vessel in a downwardly direction, said vertical partition extending upwardly a substantial distance above said pair of connections into said vessel and terminating in spaced relationship to the upper interior portion of said vessel, a pair of mist extraction elements positioned in said vessel on opposite sides of said vertical partition near the upper extremity of said vertical partition and above said connections into said vessel, said mist extraction elements being positioned across the interior of said vessel to substantially fill all of the space within between the interior of said vessel and said vertical partition, a pair of partitions positioned across said vessel, said vertical partition extending downwardly and connecting to said pair of partitions, a pair of downcomers, each of said pair of downcomers extending through one of said pair of partitions and extending downwardly therefrom within said vessel and terminating in spaced relationship above the lower interior of said vessel, said pair of partitions being inclined to drain liquid collecting on said pair of partitions toward said downcomers and a connection into the lower portion of said vessel to discharge the liquid collecting in the lower portion of said vessel from said vessel.

References Cited in the file of this patent

UNITED STATES PATENTS

| | | |
|---|---|---|
| 541,277 | Hornig | June 18, 1895 |
| 648,068 | Cookson | Apr. 24, 1900 |
| 1,117,547 | Beulke | Nov. 17, 1914 |
| 2,157,829 | Metzgar | May 9, 1939 |

FOREIGN PATENTS

| | | |
|---|---|---|
| 6,144 | Great Britain | Apr. 27, 1887 |
| 332,791 | Italy | Dec. 9, 1935 |